United States Patent [19]

Biermacher et al.

[11] Patent Number: 4,998,766
[45] Date of Patent: Mar. 12, 1991

[54] CONVERTIBLE TOP BOOT ATTACHING ARRANGEMENT

[75] Inventors: Richard F. Biermacher, West Bloomfield; Thomas G. Tallon, Metamora; Dwayne A. Black, Dearborn Heights; Billy J. Barton, Royal Oak, all of Mich.

[73] Assignee: Chrysler Corporation, Highland Park, Mich.

[21] Appl. No.: 455,680

[22] Filed: Dec. 22, 1989

[51] Int. Cl.⁵ ............................................ B60J 7/20
[52] U.S. Cl. ................................................ 296/136
[58] Field of Search ............... 296/100, 136; 150/166; 24/460, 461, 573

[56] References Cited

U.S. PATENT DOCUMENTS

| 2,664,309 | 12/1953 | Kavalar | 296/136 |
| 3,401,977 | 9/1968 | Schamel | 296/136 |
| 4,669,774 | 6/1987 | Crain | 296/136 |
| 4,679,844 | 7/1987 | Wolford et al. | 296/136 |
| 4,687,247 | 8/1987 | Muscat | 296/135 |
| 4,783,113 | 11/1988 | Padlo | 296/136 |

Primary Examiner—Margaret A. Focarino
Assistant Examiner—Andrew C. Pike
Attorney, Agent, or Firm—Edward P. Barthel

[57] ABSTRACT

An improved fastening arrangement provides for easy and quick attachment of a convertible top boot to a vehicle body. A plurality of plastic J-section fastener strips each have a forwardly extending planar pad portion, an intermediate arcuate resilient web portion, and a rearwardly extending hook-shaped portion. The pad portion is adapted for flush mounting to the underside of a boot backing panel by a plurality of rivets. The hook-shaped portion free edge is formed with an enlarged locking bead coextensive therewith. A retainer member, mounted on the body upper deck aft of the storage well, provides a transversely extending upwardly opening lead-in gap and subjacent enlarged furrow. The bead is adapted for releasable engagement in a self-seeking manner in undercut fittable retainer groove of the furrow upon snap-action passage through the lead-in gap that is hidden from view by the overlying boot.

1 Claim, 3 Drawing Sheets

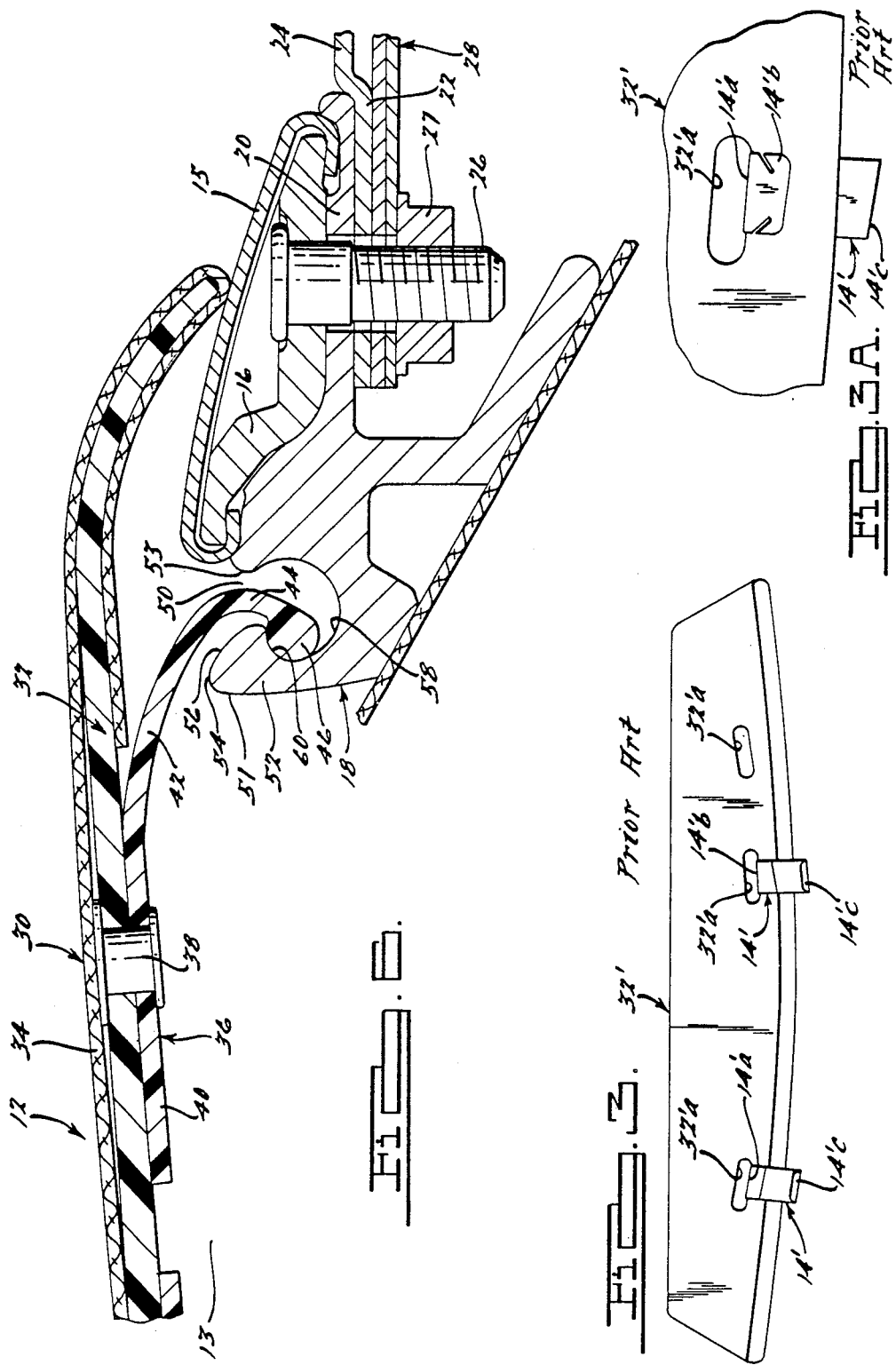

CONVERTIBLE TOP BOOT ATTACHING ARRANGEMENT

BACKGROUND OF THE INVENTION

This invention relates to automotive convertible top boot constructions used to enclose a folding top storing well formed in the vehicle body and more particularly to an improved arrangement for easily detachably securing the boot to the vehicle body.

Convertible automobiles generally have a well adjacent the rear set or storage area for receiving the foldable top when it is lowered. A cover or "boot" for enclosing this well and giving a "finished" appearance to the vehicle has long been provided. The U.S. Pat. No. 4,679,844 issued July 14, 1987 to Wolford et al. is an example of one type of fastening arrangement for a convertible boot. As explained in the Wolford patent boot usage is very often avoided due to difficulty in securing the boot to the vehicle.

With reference to prior art FIG. 1 of the drawings primed reference numerals are used to designate conventional components. FIG. 1 shows a fragmentary perspective view of a convertible vehicle 10' provided with a typical boot 12' overlying a convertible top receiving well 13'. The boot is shown having its trailing downwardly curved edge secured by metal clips 14' to a chrome trim strip 15'. Prior art FIG. 2 shows the trim strip 15' including a mounting catch member 16'. The body well extends transversely of the vehicle, generally between a rear seat or a rear storage compartment 17' (FIG. 1) and a body upper deck reinforcement and retainer member generally indicated at 18'. In FIG. 2 the retainer member 18' is shown formed with a trailing flange 20' mounted on offset flange 22' of rear deck body panel 24'. Bolts 26' having threaded nuts 27' clamp deck flange 22' intermediate the retainer trailing flange 20' and the vehicle body substructure 28'.

An example of one type of prior art conventional fastening arrangement for the boot 12' is shown in detail in FIGS. 2, 3 and 3A. The boot 12' is provided to protectively enclose the top storage well 13' and is made of a suitable flexible foldable material such as fabric or plastic for example. Generally, the boot 12' is dimensioned to slightly overlie the trim strip member 15' positioned adjacent the convertible top storage well 13'. Prior art FIG. 3 shows a plastic backing or stiffener clip panel 32' suitably secured, as by rivets, to the undersurface of the boot 12'. The clip panel 32' is formed with a plurality of elongated slots 32'a through which a reverse bend 14'a of the clip 14' extends and is anchored by lanced prongs 14'b which dig into the plastic clip panel 32'. The metal clips 14' free ends are formed with U-shaped attachment portions 14'c adapted to engage the trim strip 15'. The metal clips 14' are not only costly to make and install but they can cause scratching of the body painted finish.

Prior art FIG. 2 shows the reinforcement retainer member 18' having its forward end formed with a semicircular groove 18'a having a continuous slot 18'b. A flexible panel, shown in phantom at 19', has a continuous bead 19'a adapted to be to received in the groove 18'a. The panel 19' is suitably affixed, as by rivets (not shown), to the undersurface of a boot 12'. As the bead 19'a required that it be fed through the open end of the groove 18'a such a prior art boot attachment arrangement provided too time consuming and involved to gain acceptance by the vehicle owner.

SUMMARY OF THE INVENTION

It is an object of the present invention to provide an improved attaching arrangement for securing a boot to a convertible vehicle body. The arrangement makes use of a plurality of plastic J-sectioned interlocking fastener strips with each strip comprising a planar forwardly extending tail portion and a rearwardly extending hook-shaped portion interconnected by an intermediate downwardly curved arcuate flexible web portion. The planar tail portion is secured in a flush manner to the underside of a boot backing panel by rivets or the like. The hook-shaped portion projects rearwardly and terminates a determined distance from the boot downwardly curved trailing edge so as to be concealed thereby. The hook-shaped portion comprises a downwardly curved flange having its free edge integrally formed with an enlarged transversely extending locking bead coextensive therewith. The bead is adapted for snap-action engagement in a fittable retainer groove mounted on the vehicle body rear deck at its forward terminus.

To secure the boot the installer is required to merely grasp the trailing edge of the boot and pull rearwardly and downwardly with the attachment arrangement hidden from view. The intermediate arcuate web portion of each J-sectioned fastener strip flexes downwardly causing the locking bead to pass through an upwardly opening transversely extending lead-in slot of the groove in a self-seeking manner wherein the bead is releasably interlock d in the retainer groove without visual guidance.

These and other objects and features of the invention will become apparent to those skilled in the vehicle suspension arts upon reading the following detailed description with reference to the accompanying drawings in which:

BRIEF DESCRIPTION OF THE DRAWINGS

FIGS. 3 and 3A are enlarged fragmentary views of the underside of the clip panel and one metal clip of prior art FIG. 1

FIG. 6 is a enlarged fragmentary vertical sectional view taken generally on the line 6—6 of FIG. 5; and FIG. 7 is an elevational detail view of the underside of the boot clip panel of the present invention.

DESCRIPTION OF THE PREFERRED EMBODIMENT

Figure 1:
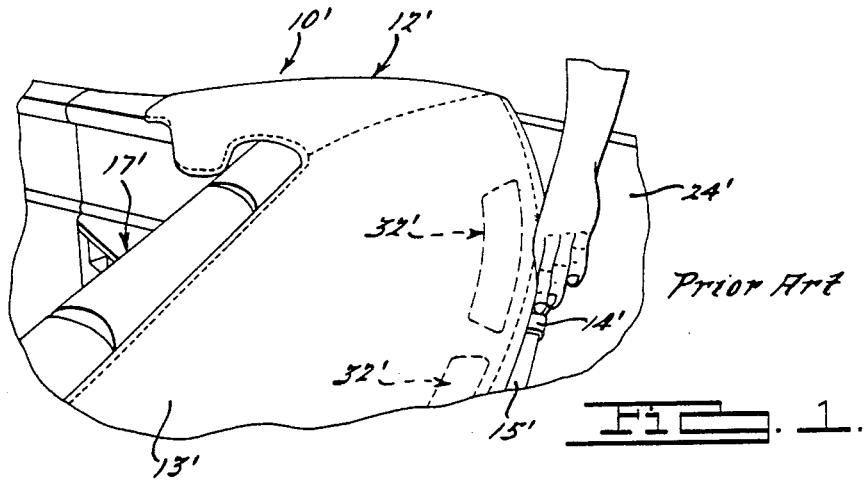
FIG. 1 is a fragmentary perspective view showing a first prior art convertible boot attachment arrangement using metal clips.
Figure 4:
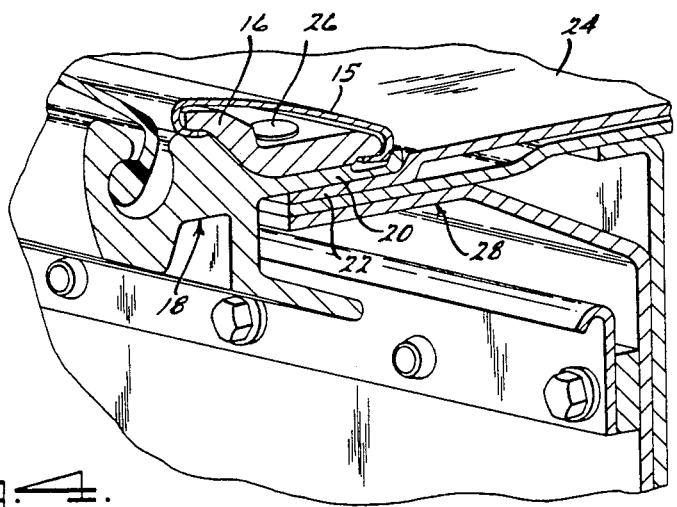
FIG. 4 is a fragmentary perspective vertical sectional view showing the improved convertible boot attachment arrangement of the present invention.
Figure 5:
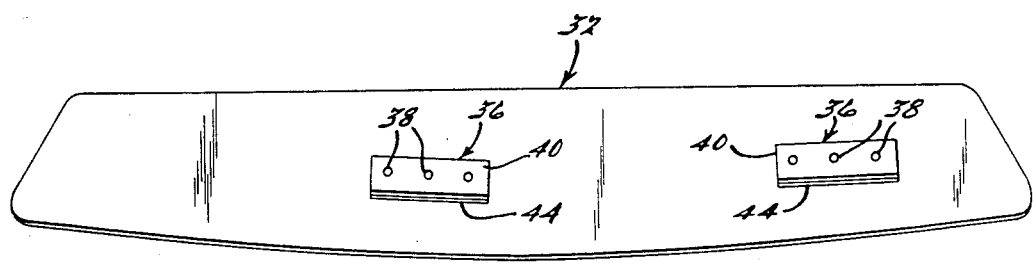
FIG. 5 is a perspective view of the rear portion of a convertible automotive vehicle with the top lowered and the boot secured in place incorporating the improved attaching arrangement of the instant invention.
Figure 3:
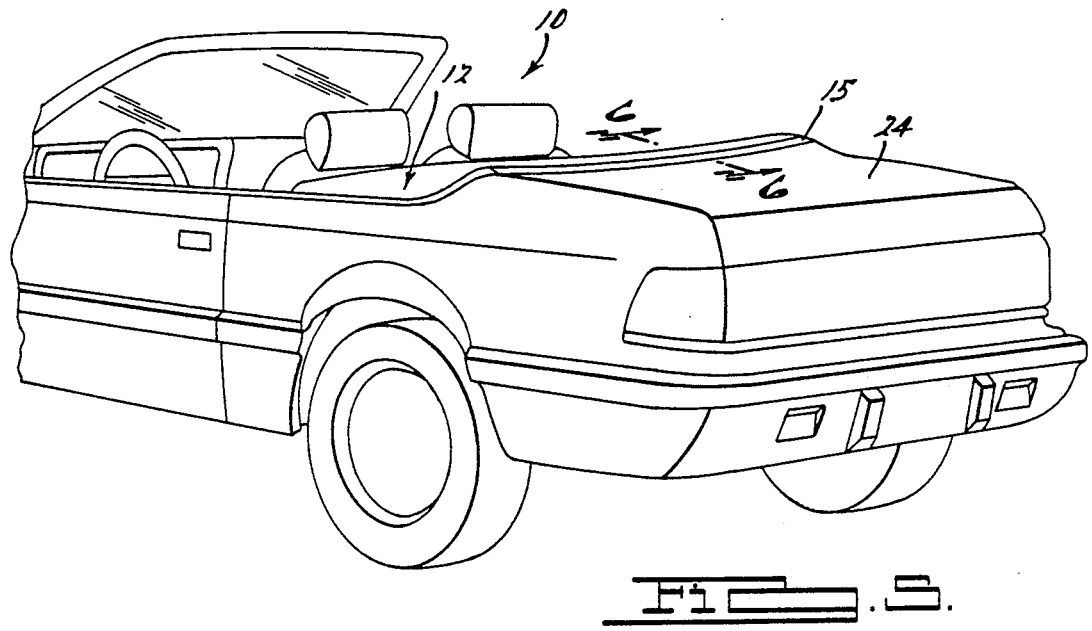
Figure 2:
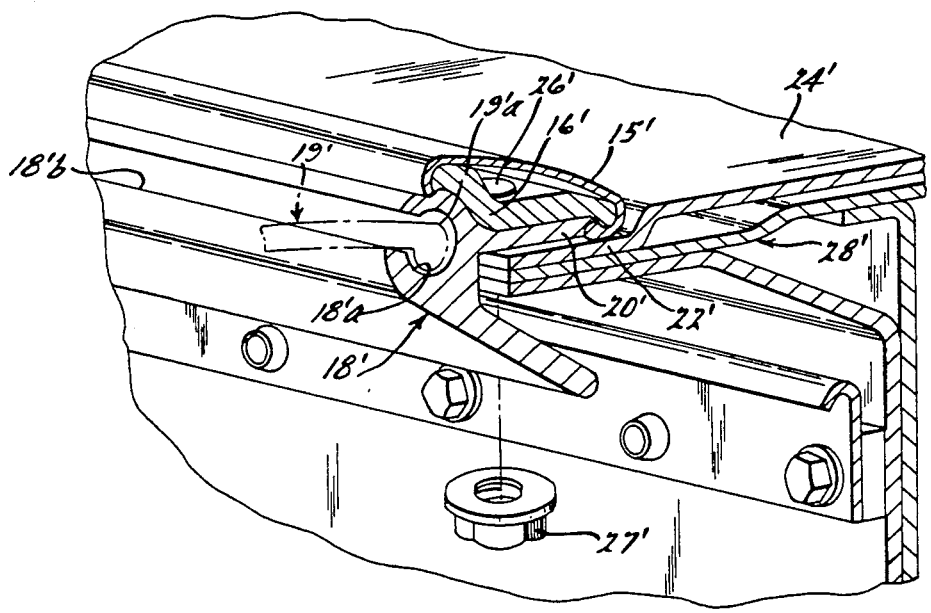
FIG. 2 is a fragmentary perspective vertical sectional view showing a second prior art convertible boot attaching arrangement using a bead and locking groove.

Referring now to FIGS. 4 and 5 of the drawings, a rear portion of a convertible vehicle 10 is illustrated showing a folding top boot 12 overlying a convertible top receiving well 13 The well extends transversely of the vehicle body, generally between a rear seat or storage compartment 17 (FIG. 1) and a body upper deck reinforcement retainer member generally indicated at 18. FIG. 6 shows the retainer member 18 formed with a rear flange 20, mounted on forward flange 22 of rear deck body panel 24, with bolt 26 and nut 27 clamping the deck flange 22 intermediate retainer rear flange 20 and body substructure 28.

The improved boot fastening arrangement of the present invention as seen in FIG. 6 comprises a boot reinforcing assembly 30 having one or more plastic stiffener fastening panels 32 suitably affixed to the undersurface of boot flexible cover, made of any suitable plastic or fabric sheet material 34, as by sewing. It will be noted in prior art FIG. 1 that a pair of stiffener clip panels, shown in dashed lines at 32', are positioned in a manner similar to the stiffener or backing fastener panels 32 of the present invention.

A detail plan view of one of the fastener panels 32 is shown in FIG. 7 wherein the undersurface is provided with a pair of J-section strips 36, formed from suitable elastomeric material, attached by conventional means such as a plurality of rivets 38. The J-section clips are in the form of a planar forward pad portion 40, adapted for flush mounting to the undersurface of their associated fastener panel 32, an intermediate arcuate or concavo-convex downwardly facing web portion 42 and terminating in a downwardly extending hook-shaped lip flange portion 44. The free edge of the lip flange portion 44 is formed with a coextensive bulb-like enlarged J-section bead portion 46 adapted to resiliently interlock with the body rear upper deck retainer member 18 in a unique manner.

With reference to FIG. 6 the retainer member has a forward head portion comprising a transversely extending lead-in gap 50 defined by a vertically disposed transversely extending leading upstanding detent-rib portion 52 and a rearwardly spaced stop shoulder 53. The detent-rib portion 52 has a forward outwardly curved face 51 terminating in a curved upper detent edge 54 followed by an rearwardly and downwardly sloped cam shoulder 56.

The upwardly opening lead-in gap terminates in an upwardly opening transversely co-extensive curved section latching furrow 58. The latching furrow forward internal surface defines an undercut fittable undercut groove 60 of an arc-shaped section. The latching furrow is adapted to initially receive the J-section bead portion 46 upon its flange portion 44 being resiliently deflected by the upper detent edge 54 and lead-in surface 56 for subsequent interlocking capture in the fittable groove 60.

Thus, to attach the boot fastener panels J-section locking strips 32 to the upper rear deck retainer member 18, which is hidden from view, the operator manually grasps the trailing edge of the boot and pulls rearwardly and downwardly until the hook-shaped flange portion 44 contacts the upstanding detent-rib 52, flexing the resilient web portion 42 toward the fastening panel 32. The locking bead 46 rides over the cam shoulder 56 and, upon the flange portion 44 striking the stop shoulder 53, the bead 46 is self guided through the lead-in gap 50 and captured in the mating furrow 58 in a blind-fastening manner. Upon the operator releasing the boot 12, the hook-shaped flange portion returns to its unflexed state wherein the bead 46 is interlocked into seated engagement with the undercut fittable groove 60 in a self-seeking manner.

While a preferred embodiment has been shown and described to illustrate the invention, other embodiments will become to those skilled in the art. Accordingly, the scope of his invention is set forth in the following claims.

What is claimed is:

1. In a motor vehicle body having a foldable convertible top, a storage well in the vehicle body for receiving the foldable top, and a convertible top boot for overlying the storage well when the top is stored therein, a boot attaching arrangement comprising:

a well opening extending generally transversely of the vehicle body, said well opening being defined along an aft periphery thereof by a coextensive retainer member secured to the vehicle body, said retainer member having engagement means associated therein; and said convertible top boot adapted to cover said well opening, said boot have at least one peripheral edge stiffener panel adapted to overlie said retainer member, fastener means secured to an underside of said stiffener panel, said fastener means adapted for locking attachment to said engagement means, the improvement in said boot attaching arrangement comprising:

said fastener means defined by a plurality of plastic J-section fastener strips, each said fastener strip comprising a forwardly extending planar pad portion and a rearwardly extending hook-shaped portion interconnected by an intermediate downwardly curved arcuate flexible web portion;

each said pad portion mounted in a flush manner on said underside, each said hood-shaped portion extending rearwardly from the arcuate web portion thereof and terminating in a downwardly curved flange, each said curved flange having a free edge thereof formed with an enlarged locking bead portion coextensive therewith;

said engagement means comprising a transversely extending upwardly opening lead-in gap, said lead-in gap defined by a forward upstanding detent rib portion having a vertically disposed forwardly facing arcuate cam surface, said arcuate cam surface terminating in a curved upper edge followed by a rearwardly and downwardly sloped arcuate guide shoulder, said arcuate guide shoulder defining, with a rearwardly spaced opposed curved stop shoulder, said lead-in gap having a predetermined longitudinal dimension through which said bead portion is passed, said lead-in gap providing an entrance of an upwardly opening circular sectioned releasably latching furrow forming in said detent rib portion an undercut fittable groove of arcuate shaped section; and whereby upon an installer applying a combined downward and rearward force on said stiffener panel causing each said intermediate arcuate web portion to resiliently flex such that each said bead portion is initially passed through said lead-in gap for reception in said latching furrow and upon each said hook-shaped portion resiliently riding over said upstanding detent rib portion and contacting said stop shoulder, said latching furrow accommodating each said bead portion for subsequent interlocking capture in said fittable groove, the installer ceases the application of the combined force without requiring the installer to view said boot attaching arrangement.

* * * * *